United States Patent [19]

Maziuk, Jr. et al.

[11] Patent Number: 6,054,056
[45] Date of Patent: Apr. 25, 2000

[54] POOL BUFFERING COMPOSITION AND METHOD OF USE

[75] Inventors: John Maziuk, Jr., Perrineville; Mark Einziger, Manalapan; David Murawski, Mercerville; M. Stephen Lajoie, Basking Ridge, all of N.J.

[73] Assignee: Church & Dwight Co., Inc., Princeton, N.J.

[21] Appl. No.: 09/211,665

[22] Filed: Dec. 14, 1998

[51] Int. Cl.⁷ ........................................................ C02F 1/76
[52] U.S. Cl. ........................... 210/752; 210/754; 210/765; 210/169; 210/192; 252/175
[58] Field of Search ..................................... 210/752, 754, 210/765, 167, 169, 192, 194; 252/175

[56] References Cited

U.S. PATENT DOCUMENTS 4,389,318   6/1983   Wojtowicz .............................. 210/755
5,700,377  12/1997   Cox ........................................ 210/754

OTHER PUBLICATIONS

Acusol detergent polymers—Product Literature Rohm & Haas, 1995.

*Primary Examiner*—David A. Simmons
*Assistant Examiner*—Betsey J. Morrison
*Attorney, Agent, or Firm*—Irving Fishman

[57] ABSTRACT

A pool buffer composition comprising about 90 to 91% by weight sodium bicarbonate; about 6.5% to about 7.5% by weight sodium carbonate; and at least one binder and/or clarifier. The composition is preferably in granular of compressed tablet form and is most advantageously used in the pool water filtration system slightly upstream of the introduction point of a chlorine pool treatment product introduction point. The product is especially advantageously used substantially simultaneously with the introduction of the chlorine pool treatment product.

13 Claims, No Drawings

POOL BUFFERING COMPOSITION AND METHOD OF USE

CROSS-REFERENCE TO RELATED APPLICATIONS

Not Applicable

STATEMENT REGARDING FEDERALLY SPONSORED RESEARCH OR DEVELOPMENT

Not Applicable

FIELD OF THE INVENTION

The invention relates to the field of swimming pool treatment products. It also relates to buffering compositions.

BACKGROUND OF THE INVENTION

Swimming pools, Jacuzzis, and spas (hereinafter collectively referred to as "swimming pools" or "pools" unless specifically indicated otherwise) contain significant amounts of water, which, relative to the environment outside of the pools, is stagnant, but exposed to the environment. Furthermore, in the normal use of the pools, users bring into the pools any number of bacteria. Therefore, over a period of time, if not disinfected in some way, the bacterial count of the pool water would make the pools unsuitable for use. This is especially problematical in pools in which the water is slightly heated. As such, pool disinfectants have been developed and used to keep the pool bacterial level well below the maximum acceptable level.

Unfortunately, many of these products result in unacceptably low pH, causing pool user irritation as well as pool wall, floor, and water-recirculation/filtration system pitting and erosion. In addition, in many areas, acid rain shifts the pH of the pools to unacceptably low levels causing the same problems.

In response to these difficulties, alkalinizing agents have been added to the pool water after disinfection has been completed. Typically, the alkalinizing agent has been sodium carbonate or sodium bicarbonate or sodium sesquicarbonate, and the material has been spread in the pool by broadcasting it across the surface of the pool.

Difficulties in this procedure include the problem that sodium bicarbonate alone does not raise the pH sufficiently, while the amount of sodium carbonate that would raise the pH appropriately without unacceptably overshooting the desired pH is small and hard to control. In addition, these compounds are fairly dusty and broadcasting them across the pool surface, to enhance efficient dispersion, frequently results in surrounding areas being dusted as well. This means that surrounding foliage frequently gets dusted with highly alkaline materials, a dusting which is known to be phytotoxic. Also, the dissolution rate is slow which can result in the pool being closed for hours. Furthermore, the alkali resting on the pool floors can cause staining, especially of colored tile.

Difficulties also arise with sodium sesquicarbonate as the alkalinizer. While this compound is a composite of both carbonate and bicarbonate, it also dissolves slowly. Therefore, it frequently sinks to the bottom of the pool and does not effectively disperse. Therefore, there is a very local area that has had its pH adjusted, while the remainder of the water does not receive appropriate alkalinization for a very extended time.

As can be readily seen, in each instance, there is an extremely large margin for error in the pH adjustment of the water, requiring adjustment, checking, back adjusting for any pH overshoot, rechecking the pH and repeating the process until a pH within appropriate limits is achieved.

A further problem with the use of the currently used commercial methods is that there is a large lag time between placing the chemicals into the pool water and when one can check the pH reasonably accurately. Checking the pH too quickly will result in a false reading, either too low or too high, depending on which pH adjustment direction was last attempted. This is so because the amount of chemicals added is relatively small compared to the total pool volume and the mixing of the chemicals in the pool water is not very efficient. Hence, one typically has to wait on the order of a pool turnover of at least three times in order to be reasonably confident that the measured pH is within acceptable limits of the pH in the pool at large. This time frame is even longer where the material is not as soluble, since a significant portion of the alkalinizer may not even be in solution when one attempts to measure the pH and base an adjustment on such measurement.

OBJECTS OF THE INVENTION

It is therefore an object of the invention to provide a non-dusting alkalinizer for a swimming pool or Jacuzzi/spa.

It is a further object of the invention to provide a buffering alkalinizer having an appropriate pH for use in swimming pools or Jacuzzis/spas.

It is another object of the invention to provide an easily dispersible alkalinizer for swimming pools and Jacuzzis/spas.

It is yet another object of the invention to provide a swimming pool or Jacuzzi/spa buffering alkalinizer which substantially avoids the overuse of chemicals in the recovery of an appropriate pH in the swimming pool or Jacuzzi/spa.

A further object of the invention is to provide a granular formulation for use in obtaining the foregoing objects.

Yet another object of the invention is to provide a compressed tablet or a capsule formulation for use in obtaining the foregoing objects.

Still other objects of the invention will be appreciated by those of ordinary skill in the art.

BRIEF SUMMARY OF THE INVENTION

These and other objects of the invention can be achieved by a granular formulation having an alkali metal bicarbonate and an alkali metal carbonate in a molar ratio of bicarbonate:carbonate of about 49:3. Advantageously, the formulation also contains at least one of a binder, dispersing aid, and a clarifier, most preferably at least one of each. The additional binder, dispersing aid and/or clarifier is preferably less than 10 weight % of the composition. The granules can be used as is, compressed into a tablet, or filled into a capsule or sachet.

DETAILED DESCRIPTION OF THE INVENTION

The formulation of the invention is of an alkali metal bicarbonate and an alkali metal carbonate in a molar ratio of bicarbonate to carbonate of about 45:3 to about 53:3, preferably about 48.25:3 to about 49.77:3, most preferably about 49:3. The alkali metal cations for use in the present invention can be any alkali metal cation, but are preferably selected from sodium and potassium, with sodium being the most highly preferred (primarily from a cost and availability issue). When sodium carbonate and sodium bicarbonate are used, the above ratios correspond to about 90 to about 91 parts by weight sodium bicarbonate to about 6.5 to about 7.5 parts by weight sodium carbonate, preferably about 90.5 to about 90.7 parts sodium bicarbonate to about 6.9 to about 7.1 parts by weight sodium carbonate, and most preferably about 90.6 parts by weight sodium bicarbonate to about 7.0 parts by weight sodium carbonate.

While the composition may contain other components, it need not. However, in a most preferred group of embodiments, the composition also contains one or more binders, dispersing aids, and clarifiers. When such binders, dispersing aids, and/or clarifiers are present, they are present collectively present in amounts of less than about 10% by weight, preferably less than about 5% by weight; more preferably in amounts of about 1.5 to about 3.5% by weight, still more preferably in amounts of from about 2.0 to about 3.0% by weight, yet more preferably about 2.25 to about 2.5% by weight, even more preferably about 2.35 to about 2.4% by weight, and most preferably about 2.38% by weight, all based on the total formulation weight.

Typical binders include polysaccharides such as starch and starch derivatives, sugar-10x; cellulosics such as sodium carboxymethylcellulose; etc. with starch being most preferred. Of the starches, corn starch is particularly preferred due to its widespread availability and relatively low cost. Many of the binders can simultaneously act as dispersing aids as well; this is especially true of starch. Typical clarifiers include low molecular weight (not more than about 50,000, preferably not more than about 25,000, more preferably not more than about 12,500, still more preferably not more than about 10,000, yet more preferably not more than about 5,000, most preferably about ,4500) polymeric materials such as such as homo or copolymers of acrylic or methacrylic acids and their alkali metal salts, alone or with other comonomers. The optional comonomers include olefinic unsaturated monomers such as maleic acid, alpha-olefins, malonic acid, methacrylic or acrylic esters of lower alkanols, etc. Preferably, the polymers are homopolymers or copolymers of acrylic acid or methacrylic acid (or their alkali metal salts) alone. Most preferably, the polymer is a homopolymer of acrylic acid. An exemplary particularly preferred polymer is Acusol 445 ND (a homopolymer of acrylic acid sodium salt having a molecular weight of about 4,500, available from Rohm and Haas Company). Any particular binder, dispersing aid, or clarifier may provide more than one of the binder, dispersing aid, and clarifier function simultaneously, in full or in part, in which case only one or two, rather than all three of these components or lesser amounts of each may be needed.

When using the polysaccharide binders, they will typically constitute at least about 75%, preferably at least about 80%, more preferably at least about 82% and most preferably about 84% of the binder/dispersing aid/clarifier total amount. (However, if the particular polysaccharide also provides dispersing aid and/or clarifier properties, it may constitute up to 100% of the binder, dispersing aid/clarifier total.) When Acusol 445ND and related materials are used as the clarifier, they will typically make up no more than about 25% by weight, preferably no more than about 20% by weight, more preferably no more than about 18% by weight, and most preferably about 16% by weight of the binder/dispersing aid/clarifier total weight. In a highly preferred composition, starch and Acusol 445 ND are used in combination in a weight ratio of starch:Acusol 445ND of about 1.6 parts to about 2.9 parts starch: about 0.3 parts to about 0.5 parts Acusol 445ND, most preferably about 2.0 parts starch: 0.38 parts Acusol 445ND. When the binders, dispersing aids, and/or clarifiers are used, the formulation may also include, but is not required to have, preservatives to prevent microbiological attack on the organic components of the formulation. Such preservatives include, but are not limited to the known benzoate and propionate preservatives, such as sodium benzoate or sodium benzoate in amounts of about 100 ppm based on the weight of the binders, dispersing aids, and clarifiers.

In one embodiment, the dry ingredients are blended together in the appropriate proportions until well mixed. The dry blends are then compacted and milled to an appropriate size. When the desired product is to be a compressed tablet or a capsule, all of the milled particles may be used. When the desired product is to be a powder product, the milled particles are screened and particle sizes less than about 250 microns (those that pass through a 60 mesh screen), preferably less than about 297 microns (those that pass through a 50 mesh screen), more preferably less than about 420 microns (those that pass through a 40 mesh screen), most preferably less than about 500 microns (those that pass through a 35 mesh screen) are returned to the compactor. Preferably particles which are larger than about 1700 microns (those retained on a 12 mesh screen), preferably larger than about 1410 microns (those retained on a 14 mesh screen), more preferably larger than 1190 microns (those retained on an 16 mesh screen, most preferably larger than about 1000 microns (those retained on an 18 mesh screen) are returned to be further milled, however, they may be utilized, if desired. As such, particles for the powder product are preferably between about less than 1700 microns but larger than about 250 microns, preferably less than about 1190 microns but larger than about 500 microns. In discussing the particle size limitations in this paragraph, it should be kept in mind that there may be particles which fall outside the ranges specified in the product. However, as long as at least 80%, preferably at least 85%, of the product adheres to the above limitations, the product should be considered within the particle size range.

In another embodiment the dry ingredients may be agglomerated through wet granulation procedures, pan agglomeration being preferred. Alternatively, one or more of the materials, especially the binder, dispersing aid and/or clarifier, may be in solution or in a slurry form and used to agglomerate the remaining ingredients. Since wet agglomeration particles are softer and tend to be more friable, and softer particles tend to crush into finer powder in the normal commercial distribution handling procedures, wet agglomeration is less desirable for a powder product intended for broadcasting across the surface of the pools. However, it is perfectly acceptable for production of powder that will be compacted into tablets or filled into capsules or into sachets.

For convenience of manufacturing, it is desirable, although not required, that the particle size range adopted for the powder product also be used for the compressed tablet, encapsulated granular formulation, and the granular formulation for inclusion within a sachet. This allows for a single production of granulated powder for all purposes.

The products are typically used in different manners depending upon whether a granulated powder is used or a compressed tablet or a capsule is used. Depending upon the size of the pH adjustment which is necessary, an appropriate amount of the powder formulation is broadcast in any convenient manner across the surface of the pool. This may be by (1) manually spreading the granulated powder; or (2) placing the powder into a suitable container, optionally dissolving the powder in a minimal amount of water, and utilizing a pressurized flow of water to draw out the concentrate and spread it over the pool. Alternatively, merely throwing portions of the total amount of composition needed per adjustment into the pool at approximately even intervals along the perimeter and center of the pool will suffice with the granular powder, as it is quick to dissolve. By having eliminated the fine particle sizes, the dusting which occurs with prior products is eliminated, thereby preventing harm to surrounding foliage. For convenience purposes, typical unit dosage amounts for a standard treatment may be prepackaged in suitable containers, making user measurement unnecessary.

For the compacted tablet or for a capsule, an appropriate number of tablets or capsules or sachets are placed in the water recirculation filter traps so that water flowing from the pool into the recirculation and filtering mechanisms passes over the tablet(s)/capsules and dissolves the product as the water enters the recirculation pipes. The amount of product in any single tablet or capsule or sachet should be approximately the amount needed for a typical pH adjustment divided by the number of water recirculation intake pipes in the typical pool or any convenient fraction thereof; however, as slight overutilization is not disadvantageous, any convenient fraction of typical pool usage amounts can constitute the total amount of the formulation to be compressed into a single tablet or encapsulated into a single capsule or sachet or packaged in any other unit of use form known in the art. Typical, but not exclusive sizes of unit of fractional unit of use forms will contain about 250 grams, about 500 grams, about 1,000 grams, about ½ lb, about 1 lb, or about 2 lbs of the formulation of the present invention.

An especially useful aspect of the invention product, especially the forms for dispensing directly into the water recirculation filter traps, is the ability to dispense the product simultaneously with disinfection chemicals dispensed into the filter traps as well. Typical of these types of chemicals is trichloroisocyanurate (trichlor) and dichloroisocyanurate (dichlor). Placement of the product of the present invention into the filter traps upstream of these disinfection products results in a much faster dissolution of the disinfection chemicals (resulting in a faster shocking of the pools) and maintaining the pH of the water entering the recirculation system at an appropriate pH to avoid pitting and erosion of the recirculation equipment and pipes.

EXAMPLES

Example 1

The following dry components are dry blended together in a ribbon blender

| COMPONENT | AMOUNT (g) |
| --- | --- |
| sodium bicarbonate | 90.6 |
| sodium carbonate | 7.0 |
| starch (food grade) | 2.0 |
| Acusol 445ND (Rohm & Haas Company) | 0.38 | to make up approximately 100 g of the blended material. The blended material is compacted, milled, and screened so that the screened product used has a particle size range as set forth below:

| Sieve Size | microns | % retained | cumulative % |
| --- | --- | --- | --- |
| 12 | 1700 | 0.02 | 0.02 |
| 14 | 1410 | 8.20 | 8.22 |
| 20 | 841 | 34.13 | 42.35 |
| 35 | 500 | 54.59 | 96.94 |
| 60 | 250 | 1.96 | 98.90 |

The fraction below 250 microns is returned to the compactor and the fraction larger than 1700 microns is returned to the milling step. The remainder of the particles are then packaged for use as a granular powder product.

Examples 2–5

In Example 2, Example 1 is repeated except that the granular powder product is compacted into tablets of approximately 250 grams each for use as a tablet product.

In Example 3, Example 1 is repeated, but the milled, unscreened product is compacted into a tablet for use as a tablet product.

In Example 4, Example 1 is repeated except that the granular powder product is filled into capsules, with each capsule containing about 250 grams of the granular powder.

In Example 5, Example 1 is repeated except that the milled but unscreened product is filled into capsules, with each capsule containing about 250 grams of the granular powder.

Examples 6–7

The products of Examples 1 and 2 are utilized in a typical pool holding about 15,000 gallons of water. When the pre adjustment pH has fallen to about 7.2 and alkalinity has fallen to about 60 ppm, the pool is at or near the lower limits of acceptability and the pool is in need of pH and alkalinity adjustment. Recommended post adjustment pH and alkalinity are in the range of about 7.6–7.8 and about 120 ppm respectively. Approximately 12 lbs of the product of the present is introduced into the pool to achieve the recommended levels. The powder product (Example 6) is broadcast manually over the pool over a period of about less than 1 minute. The tablets (Example 7) are distributed in the water filtration intake traps.

We claim:

1. A pool buffer composition comprising:
   about 90 parts to about 91 parts by weight alkali metal bicarbonate and
   about 6.5 parts to about 7.5 parts by weight alkali metal carbonate.

2. The pool buffer composition of claim 1 wherein said alkali metal bicarbonate is selected from the group consisting of sodium bicarbonate and potassium bicarbonate; and said alkali metal carbonate is selected from the group consisting of sodium carbonate and potassium carbonate.

3. The pool buffer composition of claim 1 comprising
   about 90.5 parts to about 90.7 parts by weight alkali metal bicarbonate and
   about 6.9 parts to about 7.1 parts by weight alkali metal carbonate.

4. The pool buffer composition of claim 1 further comprising
   about 1.5 parts to about 3.5 parts by weight of at least one member selected from the group consisting of binders, dispersing aids and clarifiers.

5. The pool buffer composition of claim 4 wherein said binders, dispersing aids, and clarifiers are selected from the group consisting of (a) starches, sugar—10×, and cellulosics and (b) homopolymers and copolymers of acrylic acids, and/or methacrylic acids, alone or together with minor amounts of copolymerizable monomers and mixtures thereof.

6. The pool buffer composition of claim 1 further comprising about 1.6 parts to about 2.9 parts by weight of a corn starch and about 0.3 parts to about 0.5 parts by weight of a homopolymer of acrylic acid, sodium salt having a molecular weight of about 4,500.

7. The pool buffer composition of claim 1 comprising:

about 90.6 parts by weight alkali metal bicarbonate;

about 7.0 parts by weight sodium carbonate;

about 2.0 parts by weight starch; and about 0.38 parts by a homopolymer of acrylic acid, sodium salt having a molecular weight of about 4,500.

8. The pool composition of claim 1 wherein all components described in parts by weight are present in the same number of parts by weight per hundred parts by weight of the total pool buffer composition.

9. The pool buffer composition of claim 1 wherein said composition is in the form of a granular powder or a compressed tablet.

10. The composition of claim 8 wherein said granular powder is packaged in unit of use packaging.

11. A method of treating a pool for alkalinity pH and clarity in a pool in need of such treatment comprising introducing an effective amount of a composition of claim 1 into said pool.

12. A method of enhancing or shortening pool treatment time or both in a pool being treated with a chlorine treatment product for said pool comprising introducing into said pool a composition of claim 1 substantially simultaneously with the addition of said chlorine treatment product to said pool.

13. The method of claim 12 wherein said pool has a pool filter recirculating water intake and a chlorine treatment product container region downstream of said pool filter recirculating water intake, wherein said chlorine treatment product is placed in said container region, and said composition of claim 1 is placed downstream of said recirculating water intake but upstream of said chlorine treatment product.

* * * * *